3,058,006
ELECTRICAL POWER SYSTEMS
James E. Taunt, Endwell, N.Y., assignor to International Business Machines Corporation, New York, N.Y., a corporation of New York
Filed Nov. 16, 1959, Ser. No. 853,260
4 Claims. (Cl. 307—38)

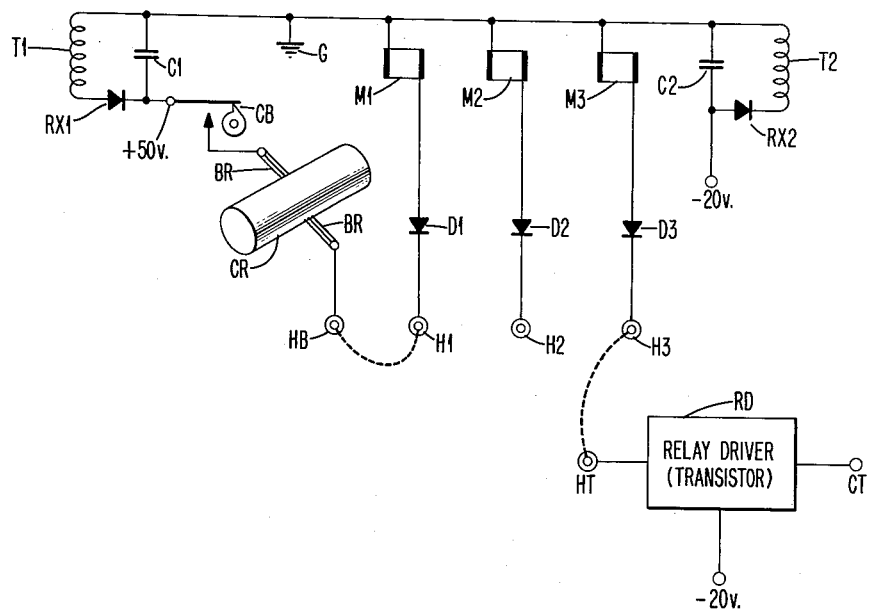
INVENTOR
JAMES E. TAUNT

United States Patent Office 3,058,006
Patented Oct. 9, 1962

This invention relates to electrical power systems and particularly to an improved electrical power system for selectively supplying operating power to one or more load devices from two or more power sources having different output voltages.

Where a load device having a predetermined nominal operating voltage is supplied with power from a source which has an output voltage essentially equal to said nominal voltage, no serious problems are involved. However, in certain instances it may be necessary to supply such a load device with power from another source having an output voltage substantially greater than said nominal voltage. In such instances it is necessary to reduce the voltage from the source by an amount equal to the difference between the source voltage and the nominal voltage. Usually this has been done by the use of voltage divider circuits or series impedances. In either event, several circuit connections must be changed or switched which adds complication to the system.

In the present invention, such complications are eliminated, so that the operation of load devices from a plurality of sources requires only the simplest of connecting means. Briefly described, the invention contemplates the provision of a nonlinear asymmetric device, such as a Zener diode, associated with each of the load devices in such manner that the energizing current for the load device will flow through the Zener diode in its low impedance direction when the load device is connected to the lower voltage power source, and will flow through the Zener diode in its high impedance direction when the load device is connected to a higher voltage source. The parts are proportioned and arranged so that the voltage drop across the Zener diode when conducting in its reverse breakdown direction will be substantially equal to the difference between the high voltage from the higher voltage source and the required nominal operating voltage of the load device. Hence, no matter which source is utilized to energize the load device, the voltage appearing thereacross will be proper for its energization, and yet not undesirably high.

Accordingly, a principal object of this invention is to provide an improved electrical power system for properly energizing one or more load devices selectively from two or more power sources having different output voltages.

Another object of the invention is to provide an improved electrical power system for energizing a load device from power sources of different voltage outputs, in which a nonlinear asymmetric device connected to the load device controls the maximum voltage which can appear across the load device.

A further object of the invention is to provide an improved electrical power system for energizing a load device from power sources of different output voltage, in which a Zener diode connected to the load device controls the maximum voltage which can appear across the load device.

Still another object of the invention is to provide an improved electrical power system for energizing a load device having a predetermined nominal operating voltage from a first power source having an output voltage substantially equal to said nominal voltage or from at least one other voltage source having an output voltage substantially greater than said nominal voltage, in which said first voltage source is connected to said load device with a given polarity, and the other voltage sources are connected to said load device with the opposite polarity with respect to said first source, and in which each load device has connected in series therewith a Zener diode pole so that current from said first source flows therethrough in the low impedance direction and current from said other sources flows therethrough in the high impedance direction.

The foregoing and other objects, features and advantages of the invention will be apparent from the following more particular description of a preferred embodiment of the invention, as illustrated in the accompanying drawing.

The single accompanying drawing illustrates in diagrammatic form one arrangement of an electrical power system arranged in accordance with the invention.

Referring to the drawing, there is shown a plurality of load devices M1, M2 and M3, which may be for example, relay coils, solenoids or other devices. The load devices are characterized by requiring a predetermined minimum amount of power for their operation. With a fixed impedance or resistance value, and a minimum current rating dictated by the power requirements and a maximum current rating determined by heating, for example, it is evident that the operating voltage impressed across the load devices must have a predetermined nominal value.

It is also apparent that if these load devices are to be operated at times by power sources delivering voltages greater than the nominal or rated operating voltage, the difference in potential must be absorbed. In the present invention, selective absorption of the voltage difference is obtained by the use of nonlinear asymmetric units, namely the Zener diodes D1, D2 and D3, the action of which will be subsequently explained.

Each of the two power supplies which are to furnish operating energy to the load devices may take any one of a number of well-known forms. For the purposes of this disclosure, each supply comprises a power transformer secondary winding such as T1, T2, the primary windings not being shown for the sake of clarity. The alternating current outputs of windings T1, T2 are rectified by half-wave rectifiers RX1, RX2 and the pulsating direct current therefrom is filtered by filter capacitors C1, C2.

The direct current output voltages have different values, such as +50 volts for the first supply and −20 volts for the second supply, the polarities being referenced to a common reference point such as the ground connection G.

Each of the load devices M1, M2, M3 has one terminal thereof connected to the reference or ground potential connection and has its other terminal connected through the associated Zener diode D1, D2, D3 to a corresponding connection terminal or hub H1, H2, H3, the latter providing a means for selectively connecting the load devices to either of the power sources, via particular control means.

In the disclosure, it is assumed that the higher voltage source is to be utilized in connection with a punched document reading apparatus, which for the sake of simplicity is shown as a circuit breaker or cam operated contact CB, and brushes BR which complete a circuit through a conductive roll CR when a perforation in the punched document passes under the reading brush. These +50 volt brush pulses are supplied to a brush hub HB, from which jumper connections may be made to any selected one or ones of the load hubs H1, H2 or H3. The low voltage source is shown as being utilized to energize relay driving units RD, each including a circuit, such as a transistor amplifier of any suitable type, requiring the lower voltage value for power. The details of the relay drivers are not shown since they are not germane to the present invention. Suffice it to say that a low voltage pulse supplied to a control terminal CT of the relay driver will cause an output pulse of substantially −20 volts to appear at the output connection of hub HT. The output hub HT can be selectively connected to any one or more of the hubs H1, H2 or H3, so that it is apparent that the load devices can be selectively connected to either of the two power sources, having different voltages.

Considering the operation of the invention, the energization of load device M1 from the higher voltage source will be described first. With circuit breaker CB closed and the reading brushes establishing contact through the contact roll CR, a circuit can be traced from the +50 volt terminal through circuit breaker CB, brushes BR and contact roll CR, terminal HB to terminal H1 via the connection shown by the dotted line, through the Zener diode in the reverse or high impedance direction, through load device M1 and via the ground or common connection to the negative side of the higher voltage source.

The Zener diode is selected so that its reverse voltage breakdown occurs at a value of applied reverse voltage substantially equal to the difference between the higher voltage source output potential, and the nominal operating voltage of the load device. In the present instance, the nominal operating voltage of the load device is assumed to be 20 volts, so that the difference is 30 volts, thus determining the reverse breakdown voltage of the Zener diode also as 30 volts.

From the foregoing, it can be seen that with a supply voltage of 50 volts, a 30 volt drop appears across the Zener diode and the load device has an appropriate 20 volts applied thereto.

Now the operation of the invention utilizing the lower voltage source will be described. A circuit for energizing load device M3 in response to signals supplied to relay driver RD can be traced from the positive side of the lower voltage or −20 volt source via the common or ground connection, through load device M3, Zener diode D3 in the forward or low impedance direction, terminals H3 and HT via the connection shown by the dotted line, the relay driver RD, and then to the −20 volt terminal of the lower voltage source. It will be noted that the Zener diode conducts in its low impedance direction, so that the voltage drop across the diode is relatively small. Accordingly, substantially all of the source voltage appears across the load device, and this value will be that required for proper operation of the load device.

From the foregoing, it can be seen that the present invention provides a means for operating a load device requiring a predetermined nominal operating voltage from a plurality of voltage sources, one or more of which can be higher in output voltage than the said nominal operating voltage, by providing an asymmetric nonlinear device connected to said load device and polarizing the power sources so that the current from the higher voltage sources flows through the nonlinear asymmetric device in its high impedance direction, and conversely, current from the lower voltage source or sources flows through the nonlinear asymmetric device in its low impedance direction.

It is apparent that more than two sources may be employed. Also it is apparent that different ones of the load devices can be operated from one or the other of the two sources without affecting the ability of other load devices to operate from another source.

While the invention has been particularly shown and described with reference to a preferred embodiment thereof, it will be understood by those skilled in the art that various changes in form and details may be made therein without departing from the spirit and scope of the invention.

What is claimed is:

1. In combination, a load device requiring a predetermined voltage value thereacross for proper energization, a plurality of power sources of different voltage values, switching means for selectively connecting said plurality of power sources to said load device, and means comprising a nonlinear circuit element connected in series with said load device for maintaining a voltage drop thereacross substantially equal to said predetermined voltage value.

2. The combination as claimed in claim 1, wherein said nonlinear circuit element is an asymmetric device having a nonlinear voltage-current characteristic.

3. The combination as claimed in claim 2, wherein the asymmetric device is a Zener diode.

4. In combination, a load device having a predetermined impedance and minimum operating current whereby a first voltage value is required to properly energize said load device, a first power means capable of supplying said minimum current at a voltage substantially equal to said first voltage value, first selecting means for selectively connecting said load device to said first power source, a second power source capable of supplying said minimum current at a voltage substantially greater than said first voltage value, second selecting means for selectively connecting said load device to said second power source, and nonlinear circuit means connected to said load device for limiting the voltage across said load device to substantially said first voltage value.

References Cited in the file of this patent

UNITED STATES PATENTS

| | | |
|---|---|---|
| 1,883,613 | Devol | Oct. 18, 1932 |
| 2,714,702 | Schockley | Aug. 2, 1955 |